United States Patent [19]

King

[11] Patent Number: 4,703,915
[45] Date of Patent: Nov. 3, 1987

[54] KNIFE GATE VALVE WITH SEMI-HARD, RESILIENT SEAT

[75] Inventor: Nolan D. King, Portland, Oreg.

[73] Assignee: Rovang, Inc., Portland, Oreg.

[21] Appl. No.: 798,296

[22] Filed: Nov. 15, 1985

[51] Int. Cl.⁴ .............................................. F16K 3/02
[52] U.S. Cl. ................................................... 251/328
[58] Field of Search ............... 251/326, 327, 328, 174, 251/176, 193, 195, 329, 333, 334

[56] References Cited

U.S. PATENT DOCUMENTS

| | | | |
|---|---|---|---|
| 2,329,315 | 9/1943 | Allen | 251/329 X |
| 2,669,416 | 2/1954 | Hilton | 251/329 X |
| 2,829,862 | 4/1958 | Wey | 251/329 X |
| 2,851,051 | 9/1958 | Englert et al. | 251/329 X |
| 3,401,915 | 9/1968 | Kim | 251/174 |
| 3,463,447 | 8/1969 | Ripert | 251/158 |
| 3,636,824 | 1/1972 | Clark | 92/294 |
| 3,897,043 | 7/1975 | McBain et al. | 251/328 |
| 4,151,999 | 5/1979 | Ringel et al. | 277/165 |
| 4,190,259 | 2/1980 | Zitting | 277/165 |
| 4,206,930 | 6/1980 | Thrane et al. | 277/165 |
| 4,377,274 | 3/1983 | Mayhew, Jr. | 251/328 X |

FOREIGN PATENT DOCUMENTS 1286484  8/1972  United Kingdom ................ 251/328

Primary Examiner—Martin P. Schwadron
Attorney, Agent, or Firm—Stoel Rives Boley Jones & Grey

[57] ABSTRACT

A knife gate valve comprises a body member to which two aligned conduits are attached. The body member has a U-shaped internal recess of predetermined length formed within it. A removable sealing member fits within the recess and extends along its entire length. The sealing member includes a bearing portion and a resilient backing portion that are positioned face-to-face to each other. The bearing portion comprises a flexible plastic-type material having a self-lubricating, semi-hard surface that contacts the blade portion of the gate as it slides along the length of the recess to close the valve. The resilient backing member comprises an elastomer strip that contacts the bearing portion surface that is opposite to the blade portion contacting surface. The resilient backing portion yields to the pressure exerted by the gate as it closes, thereby to provide a tight seal for the valve.

6 Claims, 5 Drawing Figures

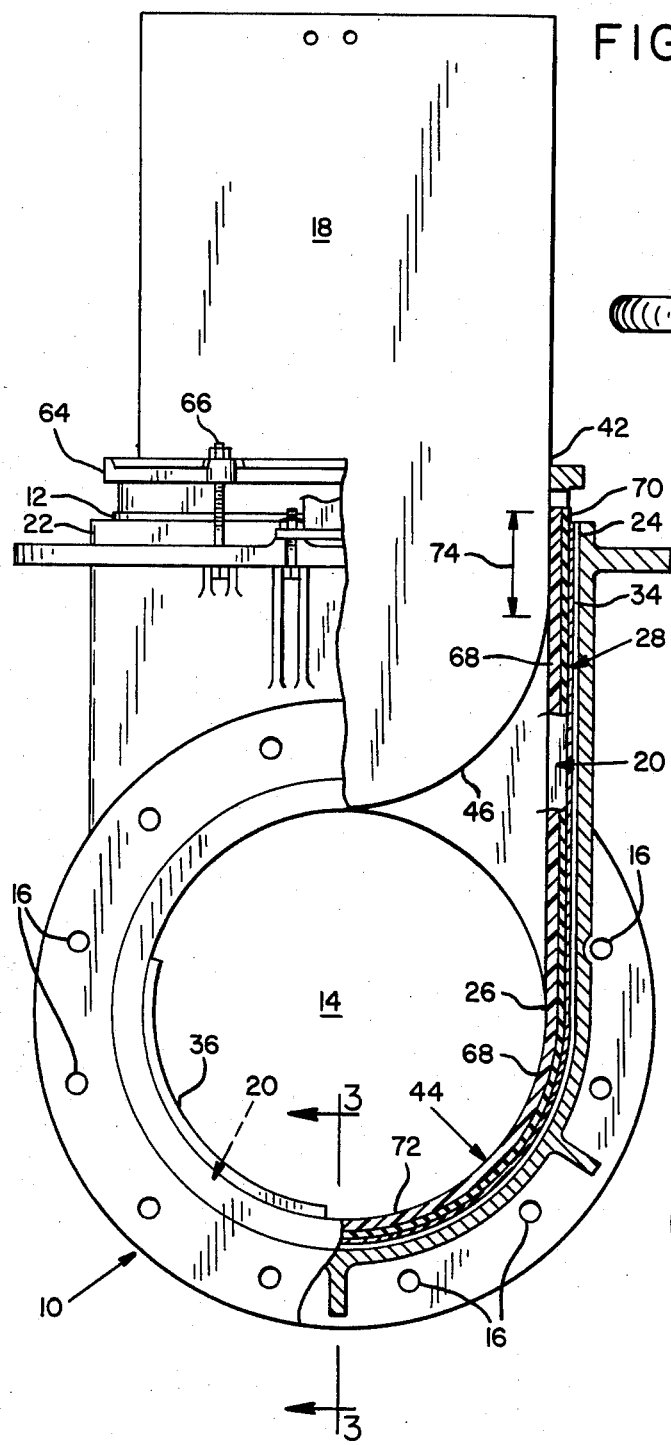
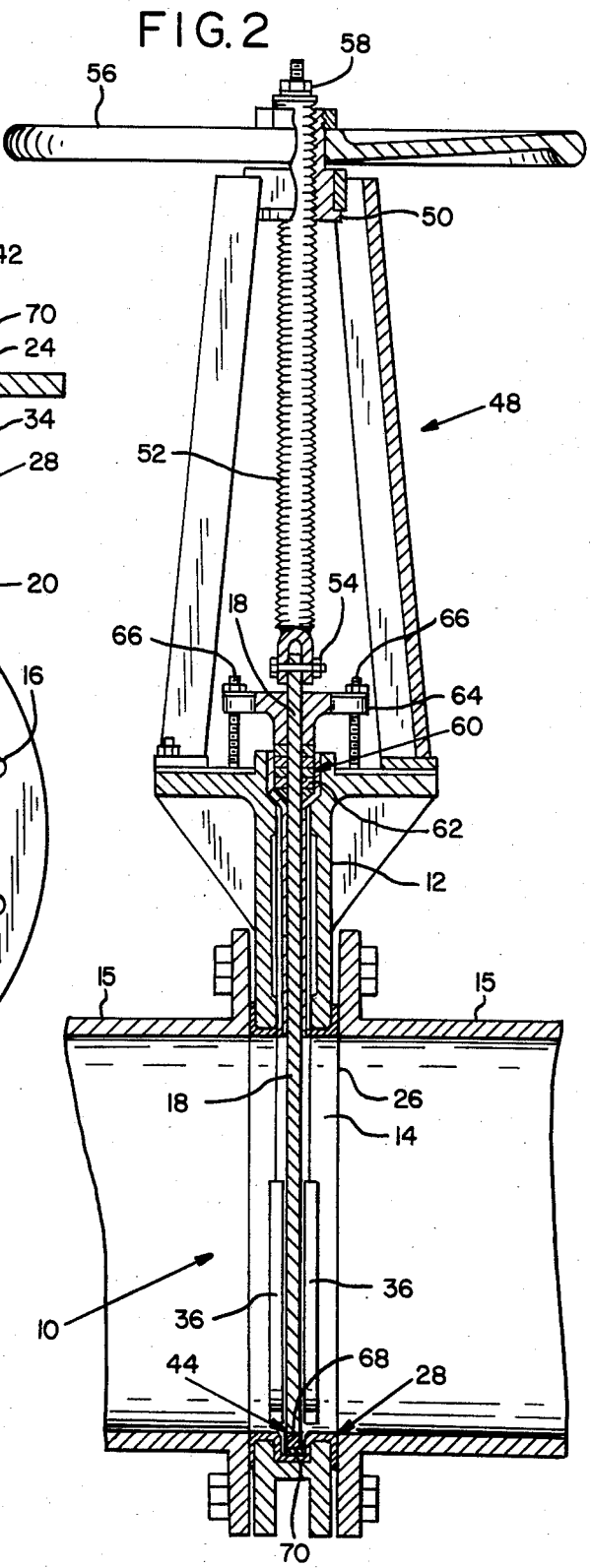
FIG. 1
FIG. 2

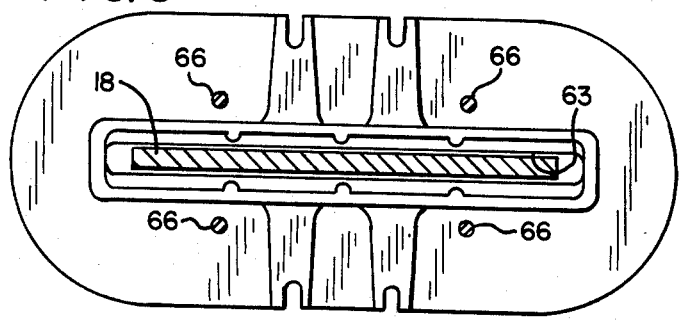
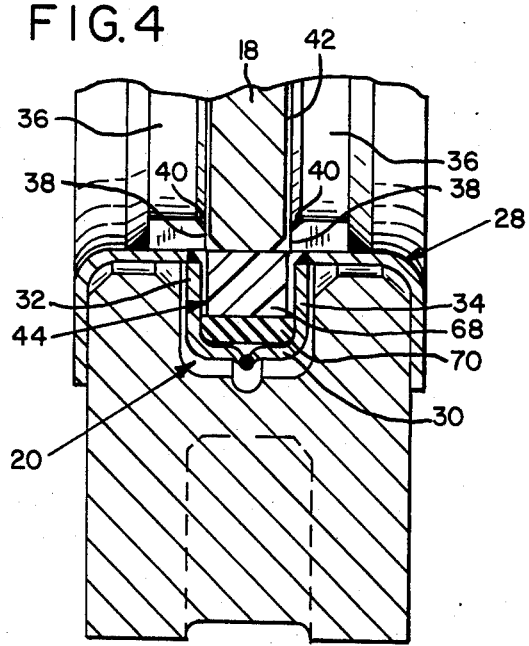
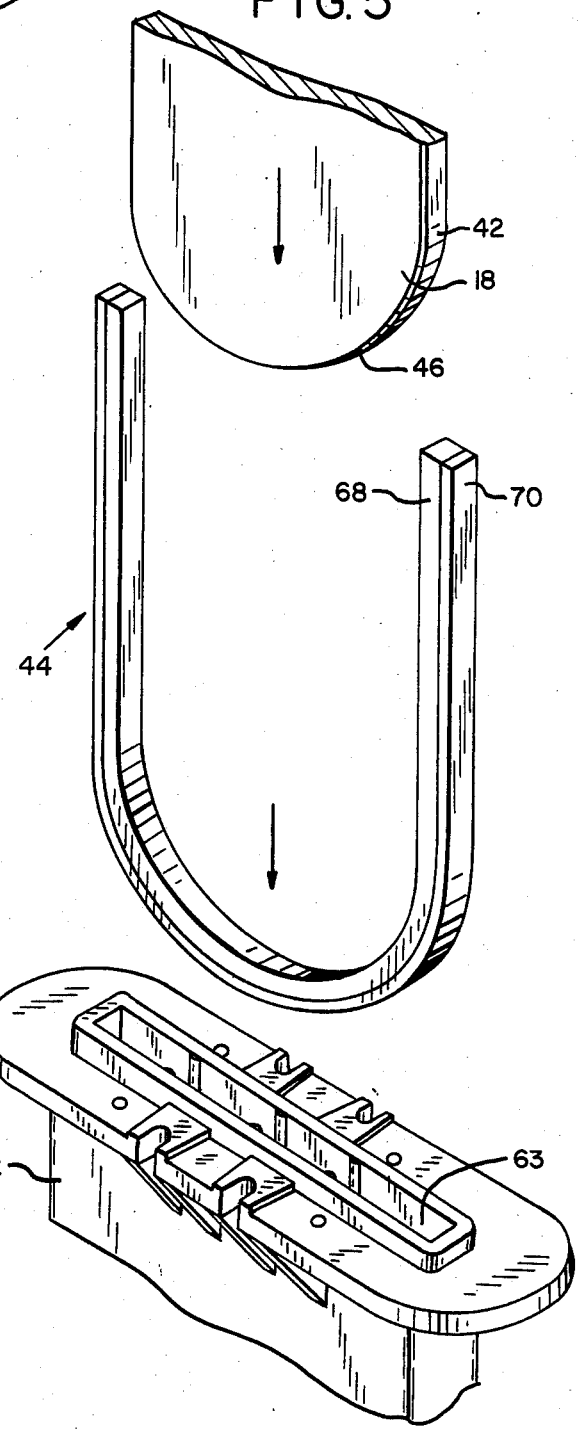

KNIFE GATE VALVE WITH SEMI-HARD, RESILIENT SEAT

BACKGROUND OF THE INVENTION

The present invention relates to knife gate valves, and in particular, in such a valve, a resilient seat that has a semi-hard, self-lubricating sealing surface which contacts the blade portion of the gate as it is lowered to close the valve.

Knife gate valves have traditionally been used to control the flow of heavy slurries transported through tubular conduits. The gate has a blade portion with a beveled edge to cut through the material suspended in the slurry as the gate is lowered to seal off the flow through the valve. The seat is typically the metal valve body, and the material in the slurry assists in sealing the valve.

A problem associated with using a knife gate to control the flow of slurries of light viscosities is that the material accumulating on the surface of the valve seat does not promote a tight seal. Knife gate valves controlling the flow of light viscosity slurries typically employ, therefore, a seal that is made of a resilient substance. The material accumulating on the seat tends, however, to cause the gate to adhere to and pull out the seat when the gate is retracted to open the valve. This is especially true for valves that control the flow of nonlubricating fluids. Lubricating the gate contacting surface of the valve seat can reduce surface friction and thereby prevent adhesion of the gate to the seat. Lubricating the surface of the seal of a knife gate valve precludes, however, its use in conduits which transport certain substances, such as, for example, air and natural gas, which would be contaminated by a lubricating substance.

SUMMARY OF THE INVENTION

An object of this invention is, therefore, to provide a knife gate valve that is capable of accomplishinq a tight seal in controlling the flow of fluids over a wide range of viscosities.

Another object of this invention is to provide in such a knife gate valve a resilient seat that has a semi-hard surface that engages the blade portion of the gate as it is moved to change the fluid flow rate through the valve.

A further object of this invention is to provide in such a valve a self-lubricating seat that decreases friction between the seat and the gate blade as it is moved to open and close the valve.

Still another object of this invention is to provide such a self-lubricating seat that is compatible for use in conduits which carry nonlubricating substances.

The knife gate valve of the present invention comprises a body member to which two aligned conduits are attached. The body member has an opening that defines a passageway between the conduits. The body member also has a U-shaped internal recess of predetermined length formed within it. The recess communicates with a portion of the opening that defines the passageway. A removable sealing member fits within the recess and extends along its entire length. The sealing member includes a bearing portion and a resilient backing portion that are positioned face-to-face to each other. The resilient backing portion comprises an elastomer strip that contacts the bearing portion surface that is opposite to the blade portion contacting surface. The bearing portion comprises a flexible plastic-type material with a semi-hard surface that contacts the blade portion of the gate as it slides along the length of the recess to close the valve. The resilient backing portion yields to the pressure exerted by the gate as it closes, thereby to provide a tight seal for the valve.

The sealing member is adaptable for insertion into and removal from the recess from the end of the body member in which the gate is inserted. The semi-hard, resilient surface of the sealing member is self-lubricating and is preferably of a relatively high abrasion and corrosion resistant type. Since it fits within the recess of the valve, the valve seat provides with a single sealing surface a tight seal for the gate, irrespective of the direction of fluid flow through the valve.

As stated above, the sealing member extends along the entire length of the recess and always maintains contact with the blade portion of the gate. This promotes the retention of the sealing member within the recess and seals the valve from the atmosphere. The sealing member is of sufficient thickness so that any part of it that does not contact the blade portion of the gate substantially occupies the space within the recess. This arrangement positions the valve seat out of the flow area of the valve.

The elastomer backing portion gives a resilient effect to the sealing member, and the semi-hard self-lubricating bearing material allows the gate to move with very little friction as it closes the valve. The sealing member of the present invention provides, therefore, a valve seat that is adaptable for use in valves inserted in conduits carrying either nonlubricating or lubricating fluids.

Additional objects and advantages of the present invention will be apparent from the following detailed description of a preferred embodiment thereof which proceeds with reference to the accompanying drawings.

BRIEF DESCRIPTION OF THE DRAWINGS

FIG. 1 is a frontal view of the body portion of the gate valve of the present invention which is shown partly in section with the gate in a fully retracted position.

FIG. 2 is a side elevation view of the knife gate valve of the present invention.

FIG. 3 is a plan view of the body portion of FIG. 1.

FIG. 4 is an enlarged detail sectional view taken along lines 3—3 of FIG. 1.

FIG. 5 shows the manner in which the bearing and resilient backing portions of the sealing member is installed in the valve of FIG. 1.

DETAILED DESCRIPTION OF A PREFERRED EMBODIMENT

With reference to FIGS. 1-4, a knife gate valve 10 comprises a body member 12 that is constructed typically of fabricated steel or cast iron. Body member 12 includes a generally circular opening 14 that forms a passageway for fluid to flow through tubular shaped conduits 15 (FIG. 2) that can be attached to valve 10 by passing bolts or other fastening means through bores 16 provided in body member 12.

A gate 18 slides within and generally along the length of the straight portions of an internal U-shaped recess 20 which is formed within body member 12. Recess 20 terminates at left-hand top end 22 and right-hand top end 24 of body member 12 and communicates with opening 14 by extending along approximately two-thirds of its periphery 26.

Recess 20 is of a generally U-shaped cross section and holds a corrosion resistant steel body liner 28 which has a complementary U-shaped portion with a base surface 30 and two adjacent side surfaces 32 and 34. The U-shaped portion of body liner 28 fits within and extends along the length of recess 20. Liner 28 carries the semi-hard, resilient seat of the present invention as will be described below.

A pair of curved guides 36 of generally rectangular cross section is welded to liner 28 on either side of the surfaces that coincide with the top edges of sides 32 and 34 of liner 28 in recess 20. Guides 36 have sides 38 which extend slightly over the open space defined by liner 28 positioned within recess 20. Guides 36 have beveled portions 40 that direct the path of gate 18 as it is lowered along the length of the straight portions of and into recess 20 to close the valve.

Gate 18 has along its side margins a blade portion 42 that slides along and fits within recess 20 formed within body member 12. Gate 18 is dimensioned to lie in a sealing relationship with a sealing member 44 that is described in detail below. Blade portion 42 of gate 18 constitutes a sealing edge which has a curved section 46 that forms a complementary sealing surface for the portion of sealing member 44 that is positioned within the curved section of recess 20.

With particular reference to FIGS. 2 and 3, yoke assembly 48 is secured to the upper portion of body member 12. Yoke assembly 48 supports a stem nut 50 through which a valve stem 52 is threaded. The lower end of valve stem 52 is secured to the upper end of gate 18 by a pair of bolt assemblies 54 (of which only one is shown in FIG. 2). The upper end of valve stem 52 passes through a threaded bore located in the center of a hand wheel 56. Turning hand wheel 56 in one direction moves gate 18 along the length of the straight portions of and inserts blade portion 42 into recess 20 to close valve 10, and turning hand wheel 56 in the opposite direction moves gate 18 along the length of the straight portions of and retracts blade portion 42 from recess 20 to open valve 10. A stop assembly 58 limits the travel of gate 18 in the direction which closes the valve.

As it moves along the length of recess 20 in body member 12 to open and close valve 10, gate 18 slides through an elongated packing box 60 of generally rectangular cross section which corresponds to that of gate 18. Packing box 60 is loaded with any suitable packing material 62, such as, for example, flax. Gate 18 also slides through an elongated rectangular aperture 63 in a packing gland 64 which fits into the top portion of packing box 60 to retain packing material 62. Packing gland 64 is secured to body member 12 by four bolt assemblies 66 (of which only two are shown in FIG. 2).

With reference to FIGS. 4 and 5, sealing member 44, which fits into and extends along the entire length of recess 20 in body member 12, includes a bearing portion 68 and a resilient backing portion 70. Bearing portion 68 is preferably a plastic-type material having sufficient flexibility to conform to the U-shape of recess 20 and having a semi-hard surface for contacting blade portion 42 of gate 18 as it moves along the length of the straight portions and within recess 20. Bearing portion 66 is of generally rectangular cross section and occupies about two-thirds of the volume defined by liner 28 in recess 20. Bearing portion 68 is preferably comprised of a plastic-like material such as an ultra-high molecular weight polyethylene. Other suitable materials for bearing portion 68 include nylon, fluoroplastic, acetal copolymer, polyurethane, and any of the other plastic-type polymers.

Resilient backing portion 70 is preferably a thin flat strip of elastomer material of sufficient width to cover base surface 30 and contact side surfaces 32 and 34 of liner 28 in recess 20. One such elastomer material is nitrile butadine. The combined thickness of bearing portion 68 and resilient backing portion 70 substantially fills the gap defined by liner 28 in recess 20 when gate 18 is not in contact with bearing portion 68.

Sealing member 44 can be formed into the general U-shape of recess 20 before insertion into body member 12 through rectangular aperture 63. Sealing member 44 can be replaced by removing it from body member 12 also through rectangular aperture 63 while valve 10 remains installed between the conduits.

With reference to FIGS. 1, 2, and 4 sealing member 44 is disposed within and along the entire length of liner 28 in recess 20. Only the semi-hard surface 72 of bearing portion 68 contacts the lower edge of blade portion 42 of gate 18. As it moves along and within recess 20, gate 18 slides along surface 72 of bearing portion 68 and pushes bearing portion 68 into recess 20. Elastomer backing portion 70 has sufficient resilience to yield to the pressure exerted by gate 18 on bearing portion 68, and thereby promotes a tight seal as valve 10 is closed. The gate contacting surface 72 of bearing portion 68 provides a self-lubricating seat for gate 18 as it slides along the length of the recess.

It will be appreciated that liner 28 can be eliminated and sealing member 44 can be fitted direct into recess 20 to function in accordance with the invention.

With particular reference to FIG. 1, gate 18 is shown in its fully retracted position. Dimension line 74 indicates the right-hand side portion of sealing member 44 that is in constant contact with blade portion 42 of gate 18. There exists a corresponding portion of sealing member 44 on the left hand side that is in constant contact with blade portion 42 of gate 18. That blade portion 42 of gate 18 remains in contact with at least some portion on either side of sealing member 44 ensures that pressure is always exerted against sealing member 44 to keep it within recess 20. (Although FIG. 4 shows the lower edges of sides 38 of guides 36 in contact with the upper edges of surface 72 of bearing portion 68, it is not the primary function of guides 36 to retain sealing member 44 in recess 20.) The constant contact of blade portion 42 of gate 18 with sealing member 44 also ensures that opening 14 of valve 10 is sealed from the atmosphere.

It will be appreciated that additional strips of resilient backing material can be used to serve as shims to provide a seat of a thickness that properly seals the gate.

It will be obvious to those having skill in the art that many changes may be made in the above-described details of the preferred embodiment of the present invention. The scope of the present invention should be determined, therefore, only by the following claims.

What is claimed is:

1. A gate valve for controlling fluid flow between two aligned conduits, comprising:

a body member having opposite sides to which the two conduits are attachable, the body member having an opening that defines a passageway between the conduits;

a gate having a blade portion that fits within an internal recess of a predetermined length formed within the body member, the gate being operable for movement along the length of the recess to occlude the opening in the passageway;

means for moving the blade portion of the gate along the length of the recess; and a sealing member positioned within the recess and forming an interface between the gate and the body member, the sealing member including a bearing portion and a resilient backing portion, the bearing portion having a semi-hard surface that makes contact with the blade portion of the gate as it travels within the recess, and the resilient backing portion having a surface which contacts a bearing portion surface that is opposite to the semi-hard surface, thereby to form a semi-hard, resilient seat for the gate to seal the passageway of the valve.

2. The gate valve of claim 1 in which the sealing member extends along the entire length of the recess, and at least a portion of the sealing member maintains continuous contact with the blade portion of the gate, thereby to promote retention of the sealing member within the recess.

3. The gate valve of claim 1 in which the recess is of an essentially U-shape, and the bearing portion comprises a plastic-type material of sufficient flexibility to conform to the U-shape of the recess.

4. The gate valve of claim 3 in which the plastic-type material is an ultra-high molecular weight polyethylene.

5. The gate valve of claim 1 in which the resilient backing portion comprises a strip of elastomer material.

6. The gate valve of claim 1 in which the resilient backing portion of the sealing member has a width that is substantially equal to the width of the recess.

* * * * *